US006835345B2

United States Patent
Lohkämper et al.

(10) Patent No.: US 6,835,345 B2
(45) Date of Patent: Dec. 28, 2004

(54) MOLDED OBJECT WITH BETTER SHORT-TIME DEFLECTION TEMPERATURE UNDER LOAD PROPERTIES

(75) Inventors: Hans-Günter Lohkämper, Haltern (DE); Siegbert Stober, Marl (DE); Ralf Schüler, Recklinghausen (DE)

(73) Assignee: Degussa AG, Duesseldorf (DE)

( * ) Notice: Subject to any disclaimer, the term of this patent is extended or adjusted under 35 U.S.C. 154(b) by 347 days.

(21) Appl. No.: 10/117,192

(22) Filed: Apr. 8, 2002

(65) Prior Publication Data

US 2002/0180098 A1 Dec. 5, 2002

(30) Foreign Application Priority Data

Apr. 6, 2001 (DE) .......................................... 101 17 107

(51) Int. Cl.$^7$ ............................................... B29C 45/73
(52) U.S. Cl. ............................ 264/328.16; 264/328.1; 264/328.14
(58) Field of Search ................. 264/328.1, 328.14, 264/328.16, 345, 299, 271.1, 272.11, 259; 525/127; 528/196, 271, 272; 438/106; 428/480

(56) References Cited

U.S. PATENT DOCUMENTS

| 3,368,995 | A | | 2/1968 | Furukawa et al. | |
|---|---|---|---|---|---|
| 4,247,514 | A | | 1/1981 | Luise | |
| 4,745,148 | A | * | 5/1988 | Chung et al. | ................ 524/504 |
| 5,326,850 | A | * | 7/1994 | Goetz et al. | ................ 528/345 |
| 2003/0139494 | A1 | * | 7/2003 | Weber et al. | ................ 523/403 |

FOREIGN PATENT DOCUMENTS

| DE | 1 694 985 | 8/1971 |
|---|---|---|
| EP | 0 139 084 | 5/1985 |
| EP | 0 559 072 A2 | 9/1993 |
| EP | 0 669 360 A1 | 8/1995 |
| EP | 0 679 689 A2 | 11/1995 |

OTHER PUBLICATIONS

Patent Abstracts of Japan, JP 61–188428, Aug. 22, 1986.

* cited by examiner

*Primary Examiner*—Angela Ortiz
(74) *Attorney, Agent, or Firm*—Oblon, Spivak, McClelland, Maier & Neustadt, P.C.

(57) ABSTRACT

A molded object is manufactured by a process, comprising:
 a) preparing a shaped object by molding a formulation of:
   35 to 100% by weight of a thermoplastic polyester,
   0 to 60% by weight of filler or a reinforcing material,
   0 to 20% by weight of an impact modifying rubber,
   0 to 30% by weight of a flame retardant,
   0 to 20% by weight of a synergist and
   0 to 5% by weight of other additives and/or processing agents; and
 b) treating the molded object for at least 1 hour at a temperature ranging from 180 to 250° C., thereby preparing a molded object with improved short-time deflection temperature under load properties.

20 Claims, No Drawings

MOLDED OBJECT WITH BETTER SHORT-TIME DEFLECTION TEMPERATURE UNDER LOAD PROPERTIES

BACKGROUND OF THE INVENTION

1. Field of the Invention

The present invention relates to a process for manufacturing molded objects with better short time deflection temperature under load properties, as well as the molded objects manufactured by the process of the invention.

2. Description of the Background

In the electric and electronics industries, the demands placed on high dimensional stability of certain molded objects with high short term heat loads has increased because of the employment of various soldering processes in the manufacturing process such as reflow or wave soldering. Here, temperature peaks of 260° C. to 450° C. occur within a time window of up to 30 seconds. This especially applies to SMD components (surface mounted devices) and MIDs (molded interconnect devices, i.e. spatial circuit carriers). The glass fiber reinforced and self-extinguishing molding compounds based on polyesters such as polybutylene terephthalate that are generally used in the electric and electronic industries for this application only satisfy these requirements to a very limited degree. This is especially the case when lead-free solders are used, where the soldering temperature employed is approximately 30° C. higher than the temperature employed during soldering when solders are used that contain lead.

A higher degree of stability can be achieved for molded objects that are subject to heat loads by irradiating them with β or γ rays. The reason for the higher degree of loadability is probably attributable to the crosslinkage of the polymer skeleton. To increase this effect, crosslinking agents are generally added as an additive. Crosslinkage is also achieved by irradiation when the polyester molding compound contains olefinic covalent bonds in the polymer skeleton. These crosslinking sites can be introduced through copolycondensation with unsaturated monomers such as 2-butane-1,4 diol when the polyester is being manufactured. Molded objects such as this are described in EP-A 0 559 072, EP-A 0 669 360, and EP-A 0 679 689. The disadvantages of the irradiation process are obvious: it requires expensive equipment and generally requires an additional logistics process, because the objects are usually irradiated by a manufacturer different from the manufacturer of the molded objects, thus making the process expensive and time consuming. Accordingly, a need continues to exist for a method of manufacturing such molded objects which is simpler and of lower cost.

SUMMARY OF THE INVENTION

Accordingly, one object of the present invention is to provide a method of manufacturing molded objects which avoids the difficulties mentioned above and, in particular, enables even higher heat loading during the process of manufacture.

Another object of the present invention is to provide molded objects of high dimensional stability.

Briefly, this object and other objects of the present invention as hereinafter will become more readily apparent can be attained by a process for manufacturing a molded object, comprising:

a) preparing a shaped object by molding a formulation of:
   35 to 100% by weight of a thermoplastic polyester,
   0 to 60% by weight of filler or a reinforcing material,
   0 to 20% by weight of an impact modifying rubber,
   0 to 30% by weight of a flame retardant,
   0 to 20% by weight of a synergist and
   0 to 5% by weight of other additives and/or processing agents; and b) treating the molded object for at least 1 hour at a temperature ranging from 180 to 250° C., thereby preparing a molded object with improved short-time deflection temperature under load properties.

DETAILED DESCRIPTION OF THE PREFERRED EMBODIMENTS

In the heat treatment of the molded article by the process of the invention, the molded object is heated for 2 to 24 hours, preferably for 4 to 18 hours at a temperature ranging from 180 to 250° C., preferably from 190 to 230° C. and particularly preferably from 200 to 220° C.

The thermoplastic polyester component of the present composition is manufactured by known methods of esterification or transesterification and subsequent polycondensation of organic dicarboxylic acids or their polyester-forming derivatives and the respective diols in the presence of catalysts.

Suitable dicarboxylic acids include aliphatic, cycloaliphatic and aromatic acids. The acid have from 2 to 36, preferably from 4 to 18 carbon atoms in the carbon skeleton. Such dicarboxylic acids include, for example, 1,4-cyclohexane dicarboxylic acid, adipic acid, sebacic acid, azelaic acid, decane dicarboxylic acid, dimeric fatty acids, phthalic acid, isophthalic acid, terephthalic acid, naphthalene dicarboxylic acids, 4,4'-diphenyl dicarboxylic acid, 4,4'-diphenylsulfone dicarboxylic acid, 4,4'-diphenylether dicarboxylic acid, 3-hexene-1,6-dicarboxylic acid, 3-octene-1,8-dicarboxylic acid, 10-eicosene-1,20-dicarboxylic acid and tetrahydrophthalic acid. The dicarboxylic acids can be employed individually or as a mixture.

Suitable diols include alkanediols, alkenediols and cycloalkane diols with 2 to 12 carbon atoms in the carbon skeleton. Such diols are, for example, ethylene glycol, butanediol-1,4, hexanediol-1,6, 1,4 and 1,3-dimethylolcyclohexane, neopentyl glycol, 2-butenediol-1,4, 3-hexenediol-1,6, 2-pentenediol-1,5, and 3-methyl-2-pentenediol-1,5. The diols can be employed individually or as a mixture.

After the polycondensation process, the polyesters generally exhibit a viscosity number in the range of 50 to 200 cm$^3$/g, preferably 70 to 180 cm$^3$/g, measured in a 0.5% phenol/o-dichlorobenzene solution (weight ratio 1:1) at 25° C. according to the procedure of DIN 53 728/ISO 1628-Part 5.

Preferred polyesters within the scope of the invention include polyethylene terephthalate, polypropylene terephthalate, polybutylene terephthalate, polyethylene-2,6-naphthalate and polybutylene-2,6-naphthalate, either as homopolymers or as copolymers.

In another preferred embodiment of the invention the polyester contains olefinic covalent bonds that are introduced via an unsaturated monomer, i.e. via an unsaturated diol and/or an unsaturated dicarboxylic acid. Both the diol component and the dicarboxylic acid component can contain 0.1 to 100 mole percent of unsaturated monomer units.

Objecticularly preferred are polyesters consisting of monomer units derived from the following monomers:

terephthalic acid and/or 2,6-naphthalene dicarboxylic acid, and 0 to 99.9 mole percent, preferably 75 to 90 mole percent, butanediol-1,4

100 to 0.1 mole percent, preferably 20 to 10 mole percent, 2-butenediol-1,4

The polyester molding compound can contain up to 60% by weight, preferably 0.1 to 50% by weight and particularly preferably 5 to 45% by weight of fiber, leaflet or particle shaped filler or reinforcing agent or mixtures of such materials.

Examples of fiber shaped fillers or reinforcing materials include glass fiber, carbon fiber, aramide fiber, potassium titanate fibers and fiber shaped silicates such as wollastonite.

Leaflet shaped fillers or reinforcing agents are, for example, mica, talcum or graphite.

Examples of particle shaped fillers or reinforcing materials include glass spheres, quartz powder, kaolin, boron nitride, calcium carbonate, barium sulfate, silicate, silicon nitride, titanium dioxide, and oxides or hydrated oxides of magnesium or aluminum.

The polyester molding compound can also contain a flame retardant component in an amount of 0 to 30% by weight. All kinds of flame retardants can be used that are normally used for polyester molding compounds, for example, polyhalogen diphenyl, polyhalogen diphenyl ether, polyhalogen phthalic acid and its derivatives, polyhalogen oligocarbonates and polycarbonates or halogenated polystyrenes, in which case the respective bromine compounds are very effective; melamine cyanurate, melamine phosphate, melamine pyrophosphate, elemental red phosphorous, organophosphorous compounds such as phosphonates, phosphinates, phosphinites; phosphine oxides such as triphenylphosphine oxide; phosphines, phosphites or phosphates such as triphenyl phosphate. Other suitable flame retardants are compounds that contain phosphorous nitrogen bonds, such as phosphononitrile chloride, phosphoric acid ester amides, phosphoric acid amides, phosphonic acid amides, phosphinic acid amides, tris(aziridinyl)-phosphinic oxide and tetrakis(hydroxymethyl)phosphonium chloride.

If a flame retardant is used a synergist in quantities of up to 20% by weight, preferably 0.1 to 15% by weight can also be used. Examples of suitable synergists include compounds of cadmium, zinc, aluminum, silver, iron, copper, antimony, tin, magnesium, manganese, vanadium and boron. Objecticularly suitable compounds include, for example, oxides of the so-called metals, as well as carbonates or oxycarbonates, hydroxides and salts of organic or inorganic acids such as acetates or phosphates or hydrogen phosphates, and sulfates.

The molding compound can also contain other additives and/or processing agents; for example antioxidants, heat stabilizers, light stabilizers, colorants, pigments, lubricants, mold release agents or flow-assisting agents.

The polyester molding compound can be manufactured by methods which are known, by mixing and extruding the starting materials in a conventional mixing facility, in objecticular a twin-screw extruder. When it has been extruded, the extrudate is cooled, comminuted and dried.

Polyester molding compounds produced in such a way can be used to manufacture molded objects with the aid of all suitable processes, for example, injection molding or extruding. Examples of such molded objects are plug connectors, bobbins, capacitor cans, switches, housing components and capacitor films.

The heat treatment can be conducted by any method which is known, for example, in a drying cabinet, in air, under an inert protective gas, or in a vacuum. Any discoloring that occurs if the compound is heat treated in air can be prevented by working under protective gas or vacuum. Preferred inert protective gases include nitrogen and argon.

Having generally described this invention, a further understanding can be obtained by reference to certain specific examples which are provided herein for purposes of illustration only and are not intended to be limiting unless otherwise specified.

In the examples which follow, the following molding compounds were used:

Molding Compound 1 polyester compound, containing the following components:

| | |
|---|---|
| 54% by weight | polybutylene terephthalate having a viscosity number J of 107 $cm^3$/g, measured on a solution of 0.5 g polyester in 100 ml phenol/o-dichlorobenzene (weight ratio 1:1) at 25° C. according to the procedure of DIN 53 728/ISO 1628-Part 5, |
| 30% by weight | glass fiber, |
| 10% by weight | flame retardant containing bromine, |
| 0.5% by weight | stabilizers and mold release agents, |
| 5.5% by weight | antimony trioxide. |

Molding Compound 2

Polyester molding compound, only differing from molding compound 1 in that it contains 20% by weight of the polybutylene terephthalate, with the other 34% of polybutylene terephthalate replaced by a copolyester, manufactured from dimethyl terephthalate and a mixture of butane-1,4-diol and 2-butene-1,4-diol, in which 18 mole percent of the diol components is derived from 2-butene-1,4-diol.

1.6 mm thick UL rods (molding compound 1 and 2) and bobbins (molding compound 2) were manufactured from the molding compound by means of injection molding.

Using the molded objects manufactured from molding compound 2, some of the objects were treated by β-rays according to state of the art methods, while the rest of the objects were subjected to heat treatment according to the present invention.

The molded objects obtained from molding compound 1 were subjected to the same heat treatment as the molded objects obtained from molding compound 2.

The heat treatment was carried out in recirculating air heat cabinet at 210° C. over a period of a maximum 24 hours in the air.

After the different heat treatment times or radiation doses, the short-time deflection temperature under load was determined with the crosslinkage tester ("soldering iron test"). This procedure involved determining the temperature by penetrating the surface of the sample to a depth of 0.1 mm with a heatable point with a diameter of 1 mm for 10 seconds at a pressure of 150 g. During the measurement, the temperature of the test point was kept as constant as possible.

The results are shown in Tables 1 and 2.

TABLE 1

Irradiation crosslinking of the molded objects from Molding Compound 2 (irradiation duration up to 24 hours).

| Radiation dose [kGy] | Short-time deflection temperature under load [° C.] | |
| --- | --- | --- |
| | 1.6 mm UL rod | Bobbin |
| 0 | 250 | 250 |
| 200 | 312 | 270 |
| 250 | 326 | 282 |
| 300 | 338 | 292 |
| 350 | 348 | 304 |

TABLE 2

Heat treatment of molded objects from Molding Compounds 1 and 2 at 210° C.

| Time [h] | Short-time deflection temperature under load [° C.] | | |
| --- | --- | --- | --- |
| | Mold. compound 1 1.6 mm UL rod | Mold. compound 2 1.6 mm UL rod | Mold. compound 2 bobbin |
| 0 | 255 | 250 | 250 |
| 2 | 285 | 305 | 269 |
| 4 | 290 | 355 | 305 |
| 8 | 320 | 400 | 350 |
| 24 | 344 | 440 | 410 |

It is evident by the measurements on the UL rod that heat treatment of a conventional polyester molding compound produces similar results to irradiation crosslinking of a molding compound with a proportion of unsaturated monomer. On the other hand, heat treatment on molding compound 2 produces much more enhanced short-time deflection temperature under load properties. The differences observed between the UL rods and the bobbins are the result of the thickness of the samples.

The disclosure of German priority application 10117107.2 filed Apr. 6, 2001 is hereby incorporated by reference into the present application.

Obviously, numerous modifications and variations of the present invention are possible in light of the above teachings. It is therefore to be understood that within the scope of the appended claims, the invention may be practiced otherwise than as specifically described herein.

What is claimed as new and is intended to be secured by Letters Patent is:

1. A process for manufacturing a molded object, comprising:
   a) preparing a shaped object by molding a formulation of:
      35 to 100% by weight of a thermoplastic polyester prepared by copolymerizing a diol which is an alkanediol, an alkenediol or a cycloalkane diol, each of 2 to 12 carbon atoms, and an aliphatic, cycloaliphatic or aromatic dicarboxylic acid,
      0 to 60% by weight of filler or a reinforcing material,
      0 to 20% by weight of an impact modifying rubber,
      0 to 30% by weight of a flame retardant,
      0 to 20% by weight of a synergist and
      0 to 5% by weight of other additives and/or processing agents; and
   b) treating the molded object for at least 1 hour at a temperature ranging from 180 to 250° C., thereby preparing a molded object with improved short-time deflection temperature under load properties.

2. The process as claimed in claim 1, wherein the polyester is selected from the group consisting of polyethylene terephthalate, polypropylene terephthalate, polybutylene terephthalate, polyethylene-2,6-naphthalate and polybutylene-2,6-naphthalate.

3. The process as claimed in claim 1, wherein, in the polyester, the diol component and/or dicarboxylic acid component contains 0.1 to 100 mole percent of unsaturated monomer units.

4. The process as claimed in claim 1, wherein the polyester consists of monomer units that are derived from the following dicarboxylic acid and diol monomers:
   a dicarboxylic acid selected from the group consisting of terephthalic acid and 2,6-naphthalene dicarboxylic acid, and
   a diol component of 0 to 99.9 mole % butanediol-1,4 and 100 to 0.1 mole % 2-butenediol-1,4.

5. The process as claimed in claim 4, wherein, in the diol portion of the polyester, 10 to 25 mole % of the diol monomer units are derived from 2-butenediol-1.4.

6. The process as claimed in claim 1, wherein, in the polyester, the dicarboxylic acid component is 1,4-cyclohexane dicarboxylic acid, adipic acid, sebacic acid, azelaic acid, decane dicarboxylic acid, dimeric fatty acids, phthalic acid, isophthalic acid, terephthalic acid, naphthalene dicarboxylic acids, 4,4'-diphenyldicarboxylic acid, 4,4'-diphenylsulfone dicarboxylic acid, 4,4'-diphenylether dicarboxylic acid, 3-hexene-1,6-dicarboxylic acid, 3-octene-1,8-dicarboxylic acid, 10-eicosene-1,20-dicarboxylic acid or tetrahydrophthalic acid.

7. The process as claimed in claim 1, wherein, in the polyester, the diol component is ethylene glycol, butanediol-1,4, hexanediol-1,6, 1,4- or 1,3-dimethylolcyclohexane, neopentyl glycol, 2-butenediol-1,4,3-hexenediol-1,6,2-pentenediol-1,5 or 3-methyl-2-pentenediol-1,5.

8. The process as claimed in claim 1, wherein the polyester has a viscosity number ranging from 50 to 200 cm$^3$/g as measured in a 0.5% phenol/o-dichlorobenzene solution at 25° C.

9. The process as claimed in claim 8, wherein the polyester has a viscosity number ranging from 70 to 180 cm$^3$/g as measured in a 0.5% phenol/o-dichlorobenzene solution at 25° C.

10. The process as claimed in claim 1, wherein the molding compound contains 0.1 to 50% by weight of filler or reinforcing agent.

11. The process as claimed in claim 10, wherein the molding compound contains 5 to 45% by weight of filler or reinforcing agent.

12. The process as claimed in claim 1, wherein the molding compound contains 0.1 to 25% by weight of flame retardant.

13. The process as claimed in claim 1, wherein the molding compound contains 0.1 to 15% by weight of synergist.

14. The process as claimed in claim 1, wherein the molded object is manufactured by injection molding or extruding.

15. The process as claimed in claim 1, wherein the molded object is treated for 2 to 24 hours at said temperature.

16. The process as claimed in claim 15, wherein the molded object is treated for 4 to 8 hours.

17. The process as claimed in claim 1, wherein the molded object is treated at 190 to 230° C.

18. The process as claimed in claim 17, wherein the molded object is treated at 200 to 220° C.

19. A molded object manufactured by the process according to claim 1.

20. The molded object as claimed in claim 19, wherein the object is a plug connector, a bobbin, a printed circuit board, a housing with a printed circuit board function, a relay component, a capacitor can, a switch, a housing component or capacitor film.

* * * * *